Figure 3:
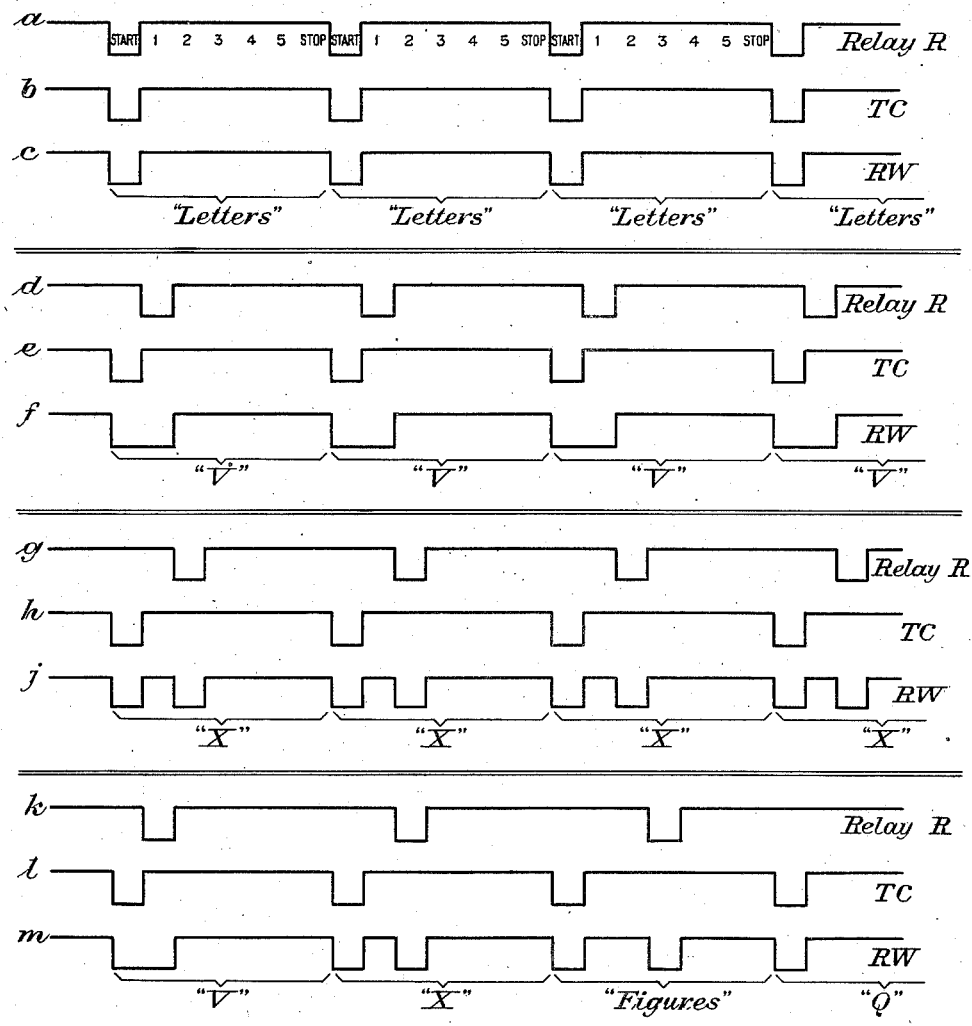

June 10, 1947.  W. B. MARTIN  2,421,954
APPARATUS FOR INDICATING TELETYPEWRITER SPEED
Filed Oct. 20, 1944  2 Sheets-Sheet 1
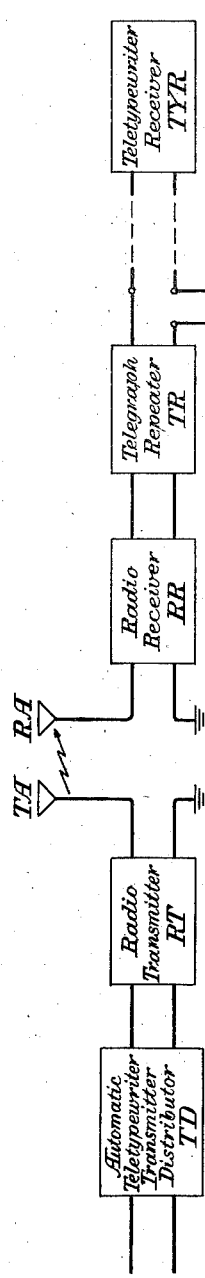
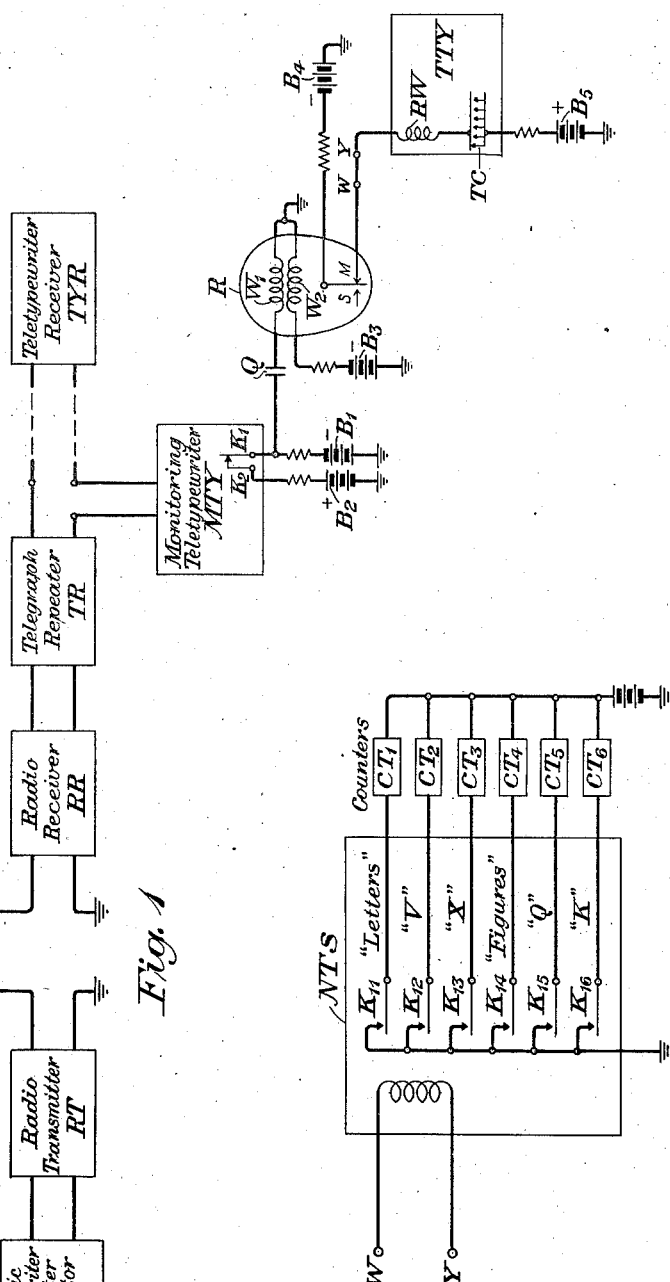
INVENTOR
W. B. Martin
BY Jefferson Ehrlich
ATTORNEY Patented June 10, 1947

2,421,954

UNITED STATES PATENT OFFICE 2,421,954

APPARATUS FOR INDICATING TELETYPEWRITER SPEEDS

Wade E. Martin, Ramsey, N. J., assignor to American Telephone and Telegraph Company, a corporation of New York Application October 20, 1944, Serial No. 559,622

9 Claims. (Cl. 178—69)

This invention relates to teletypewriter apparatus and more particularly to arrangements for indicating the speed at which a teletypewriter is transmitting signals.

When an automatic teletypewriter transmitter is transmitting teletypewriter signals of the start-stop type over a wired circuit or radio path to a teletypewriter receiver, the signals will ordinarily be reproduced with good intelligibility if the transmitter and receiver are operating at the same speed. If the transmitter speed should change during transmission, the teletypewriter signals reproduced will become distorted. In fact, a small change in the speed of the teletypewriter transmitter may ofttimes be sufficient to render the signals reproduced unintelligible. Such conditions have been found to arise particularly where the automatic teletypewriter transmitter was supplied with power from an unregulated source or where its motor was controlled by a governor.

It is therefore one of the objects of this invention to provide simple apparatus for measuring or observing the speed of operation of an automatic teletypewriter transmitter.

This object may be accomplished by employing apparatus which converts the transmitted signals into "letters" signals and combines the latter signals with other "letters" signals obtained from a local teletypewriter operating at its optimum speed. If the "letters" signals are received from both sources at the same speed, that is, if these two groups of "letters" signals are received synchronously, then the third signal obtained from their combination will continuously repeat itself. This third signal will also be "letters" if the component signals are in phase with each other. That is, if the two groups of "letters" signals are received synchronously and in phase, the resultant signal will be the same "letters" signal. If the two groups of "letters" signals are received synchronously but out of phase with each other, any one of five other signals, namely, "V", "X", "figures", "Q" or "K", will be produced by their combination, the particular signal obtained from the combination depending on the phase difference of the two groups of "letters" signals. On the other hand, if the two groups of "letters" signals are received at different speeds, repeated signals "V", "X", "figures", "Q", "K" and "letters" will appear in a cycle and the cycle will be reproduced in succession. The number of times each signal is reproduced in succession while passing through its cycle will be a measure of the difference in speed between the local teletypewriter transmitter and the automatic teletypewriter transmitter which is being observed.

This invention will be better understood from the more detailed description hereinafter following when read in connection with the accompanying drawing in which Figure 1 illustrates one embodiment of the invention given merely for illustrative purposes, Fig. 2 shows a counting circuit suitable for use with the arrangement of Fig. 1, and Fig. 3 shows curves to explain certain of the phenomena of the apparatus of the invention.

Referring to Fig. 1 of the drawing, there is shown the transmitter-distributor TD of an automatically operated teletypewriter, which may be of any well-known type capable of producing signals of the start-stop type. The five-pulse signals produced by the transmitter-distributor are modulated on a radio wave at the radio transmitter RT and are radiated through space by the transmitting antenna TA. These radio signals are received by the receiving antenna RA, then demodulated at the radio receiver RR, the demodulated signals being transmitted through the telegraph repeater TR in a well-known manner to the teletypewriter receiver TYR where the signals may be reproduced in typed form. If the automatic transmitter-distributor TD is operating at the same speed as the teletypewriter receiver TYR, the signals will ordinarily be reproduced intelligibly. However, if the speed of the transmitter-distributor TD should increase or decrease so as to be out of step with the teletypewriter receiver TYR, the reproduced signals may become unintelligible. Apparatus for observing the speed deviation of the distant transmitter-distributor will now be described.

A monitoring teletypewriter MTY, which may be of the No. 14 or No. 15 type, for example, is connected to the output side of the telegraph repeater TR and in series with the teletypewriter receiver TYR. The monitoring teletypewriter MTY is equipped with universal or common contacts $K_1$—$K_2$ which will be opened and closed once for each signal received from the transmitter-distributor TD or for each operation performed by the transmitter-distributor TD. In other words, the universal contacts $K_1$—$K_2$ will be opened once and closed once for each group of pulses corresponding to a signal or character transmitted by the transmitter-distributor TD and received via the telegraph repeater TR by the teletypewriter MTY. The universal contact structure $K_1$—$K_2$ is of well-known type and is shown and described, for example, in the application of W. M. Bacon et al., Serial No. 248,426, filed December 30, 1938. The contact $K_1$ is connected to a negative battery $B_1$ which is grounded, and contact $K_2$ is connected to a positive battery $B_2$ which is also grounded. The contact $K_1$ is also connected to a condenser Q and the upper winding $W_1$ of a relay R. The lower winding $W_2$ of relay R is connected to a battery $B_3$ which supplies current continuously thereto to bias the armature of the relay to its contact M. The armature and contact M of relay R are connected in a series circuit which includes battery $B_4$, the armature and contact M of relay R, the receiving winding RW and transmitting contacts TC of a teletypewriter TTY and battery $B_5$. The teletypewriter TTY may be of the No. 14 type, for example, arranged for repeat keyboard operation, and its motor (not shown) should rotate at the optimum speed for the system. The motor may be of the synchronous type if its driving power frequency is adequately controlled so that it may maintain a constant speed of operation. When the "letters" key of this teletypewriter TTY is pressed and locked down, the "letters" character or signal will be reproduced 368 times per minute, for example, on a "60 speed" circuit.

When the monitoring teletypewriter MTY is receiving no signals from the transmitter-distributor TD, the universal contacts $K_1$—$K_2$ will be held closed and there will be no charge on condenser Q. The current in winding $W_1$ of relay R will then be a nullity and hence the armature of relay R, acting under the influence of the biasing current in winding $W_2$, will be held against its contact M. The armature of relay R will be held against its contact M whether signals are being transmitted by the transmitting contacts TC of teletypewriter TTY, or when no signals are being so transmitted. It is preferable to keep teletypewriter TTY unoperated until signals are received by its receiving winding RW and to operate the teletypewriter TTY by locking its "letters" key only when signals are being received from relay R, but the invention can be carried out even if teletypewriter TTY is producing "letters" signals continuously, even when no signals are being received by the receiving winding RW from the relay R.

When the monitoring teletypewriter is receiving a signal from the automatic transmitter-distributor TD via the telegraph repeater TR, the contacts $K_1$—$K_2$ will first be opened and then closed. As soon as contacts $K_1$—$K_2$ are opened, the battery $B_1$ will be connected in series with condenser Q and the winding of relay R. An increasing charge will be applied to condenser Q, rendering its left-hand terminal negative with respect to its right-hand terminal. The charging current traversing the winding $W_1$ will be sufficient to overcome the biasing effect of winding $W_2$ and hence the armature of relay R will be moved to its contact S. A spacing pulse will then be received by the receiving winding RW of teletypewriter TTY and this pulse will start the teletypewriter TTY in operation. This pulse will cause the teletypewriter TTY to register a "letters" signal or character. As soon as the charging current through winding $W_1$ has been sufficiently reduced in magnitude, the armature of relay R will be returned to its contact M. Moreover, the contacts $K_1$—$K_2$ will become closed before the next signal is received by the monitoring teletypewriter MTY. The constants of the series circuit of condenser Q have been chosen so as to have the armature of relay R open its contact M for about 22 milliseconds.

When another teletypewriter signal is received by teletypewriter MTY, the contacts $K_1$—$K_2$ will again be opened once and then closed and a like signal will be registered by teletypewriter TTY. This cycle will be repeated as often as signals are received by teletypewriter MTY. The starting pulse transmitted by relay R to teletypewriter TTY will be produced at the beginning of each signal received by teletypewriter MTY and this will occur no matter what may be the character of the signal received by teletypewriter MTY. Thus signals will be registered by teletypewriter TTY in conformity with the signals reaching teletypewriter MTY.

Observing the registration of these signals on the machine TTY, the operator may press his "letters" key and lock it so as to cause the transmitting contacts TC to transmit "letters" signals continuously. The receiving winding RW will then receive two signals, one obtained from relay R due to the periodic opening and closing of the universal contacts $K_1$—$K_2$ and another from the transmitting contacts TC. These signals will be combined by the receiving winding RW and they will produce a third signal which may or may not be the "letters" signal, as will now be explained. The third signal will now be registered by the teletypewriter TTY.

If the curve $a$ of Fig. 3 illustrates the types of pulses received by the receiving winding RW from relay R and curve $b$ represents the types of pulses received by the winding RW from the transmitting contacts TC, the combined signal is shown by curve $c$. All three curves $a$, $b$ and $c$ correspond to the "letters" signal. In other words, if curves $a$ and $b$ are identical and correspond to the "letters" signal, the third signal of curve $c$ will represent the same signal and hence the machine TTY will register this signal. These conditions will occur when the distant machine TD is operating at the same speed as machine TTY and the two machines are in phase with each other. In this case the teletypewriter TYR will accurately reproduce the signals received from the distant transmitter TD. Under these conditions of equal speed and equal phase, the machine TTY will repeat the "letters" signal with each received signal. However, the machines TD and TTY may operate at different speeds or in different phases and it is these variables that the apparatus of the invention is intended to detect.

If the curve $d$ represents the signal received by the winding RW from relay R and curve $e$—the same as curve $b$—represents the "letters" signal received by winding RW from the transmitting contacts TC, the curve $f$ will exhibit the resultant signal arising from the combination of the component signals. This signal corresponds to the letter "V" and the teletypewriter TTY will record this letter. Curves $d$, $e$ and $f$ show that the machines TD and TTY are operating at the same speed, but out of phase with each other. The two machines are out of phase by the time interval of one pulse of the teletypewriter signal. Because the machines are operating at the same speed, the signal "V" will be recorded by machine TTY in a continuous string. If the machines TD and TTY are out of phase by two pulses but are operating at the same speed, the signal printed by teletypewriter TTY will be the letter "X", as shown by a comparison of curves $g$, $h$ and $j$. The letter "X" will be repeated indefinitely. If the phase difference is three pulses, the character "figures" will be repeated indefinitely. If the phase differences are four pulses or five pulses, the characters "Q" or "K", respectively, will be repeated indefinitely. Hence an inspection of the record produced by teletypewriter TTY will indicate whether the machine TD is operating at the same speed as the teletypewriter TTY and in a constant phase difference.

To illustrate the conditions when a more abrupt change in speed is encountered, reference is made to curves $k$, $l$, and $m$ of Fig. 3. Here the first signal received from the distant transmitter TD is out of phase with the first signal from the transmitting contacts TC by one pulse, the second signal is out of phase by two pulses, etc. The teletypewriter TTY will record the signals "V," "X", "figures", "Q", "K" and "letters" in succession and this cycle of signals will be repeated again and again. The appearance of this cycle of signals is symptomatic of a difference in speed of the two machines. If the speed of the transmitter TD exceeds the speed of teletypewriter TTY, the order of the signals will be as already noted. However, if the speed of transmitter TD is less than that of teletypewriter TTY, the signals will appear on teletypewriter TTY in reversed order during the first cycle. The frequency at which the cycle of signals "V", "X", etc., appears on teletypewriter TTY is proportional to the difference in speed of transmitter TD with respect to teletypewriter TTY. If the transmitter TD is only slightly faster than teletypewriter TTY, the signal "V" may appear 25 times in succession, followed by signal "X" 25 times in succession, then followed by "figures" 25 times in succession, etc. A wider speed discrepancy will be accompanied by a smaller number of repetitions of each of the signals of the 6-signal cycle, although the number of cycles appearing in any time interval will be correspondingly increased, as already mentioned.

The difference in speed $x$ between transmitter TD and the transmitting contacts TC of teletypewriter TTY may be determined from the following formula:

$$x = \frac{AC}{BD}$$

In this formula A represents the time interval in milliseconds of one of the signal pulses, A being 22 in a teletypewriter machine operating on the so-called "60 speed" basis; B represents the time in milliseconds for transmitting all of the pulses of any signal or operation including the start pulse and the stop pulse of the signal, B being 163 for signals of the start-stop code; C represents the number of signals or operations per minute for "60 speed" transmission and this factor is 368 in the ideal case; and D represents the number of times each signal such as "V" or "X", etc., appears on teletypewriter TTY in any cycle when the transmitter TD is not synchronized with the teletypewriter TTY. The speed of the distant transmitter will be $368 \pm x$ operations or signals per minute, the positive quantity corresponding to a transmitter TD operating at higher speed than teletypewriter TTY and the negative quantity corresponding to a slower speed.

The following table will give the approximate speed differences $x$ in the operations or signals per minute corresponding to the number of times each character such as "V", "X", etc., is repeated in a cycle, this number being D in the formula:

| D | $x$ |
|---|---|
| Infinite | None |
| 50 | 1 |
| 25 | 2 |
| 17 | 3 |
| 13 | 4 |
| 10 | 5 |
| 8 | 6 |
| 7 | 7 |
| 6 | 8 |
| 5 | 10 |

The apparatus of this invention shown in Fig. 1 may have automatic counting apparatus associated therewith to count the number of signals such as "V", "X", etc., appearing in a single cycle. Such apparatus is shown in Fig. 2 and may be inserted between terminals W and Y of Fig. 1 so as to be in series with teletypewriter TTY. This apparatus includes a nontyping selector NTS which has a contact for each different signal of the cycle. For example, contact $K_{11}$ will be closed when the signal "letters" is received and the counter $CT_1$ will indicate the number of times that this signal is received in any cycle. Contact $K_{12}$ will be closed when the signal "V" is received and counter $CT_2$ will indicate the number of times that this signal is repeated in any cycle. These counters $CT_1$, $CT_2$, $CT_3$, etc., will ordinarily produce the same records at the end of the cycle, whereupon the counters may then be returned to their initial positions.

The apparatus of this invention may be arranged in different forms as will be apparent from a reading of the specification. The teletypewriter TTY may be replaced by two machines, one a transmitter-distributor arranged to send the signal "letters" continuously, and the other a "receiving only" teletypewriter to perform the functions of the receiving winding RW. These and other modifications are to be assumed as within the scope of this invention.

While this invention has been shown and described in certain particular embodiments merely for illustrative purposes, it will be clearly understood that the general principles of this invention may be applied to other and widely varied organizations without departing from the spirit of the invention and the scope of the appended claims.

What is claimed is:

1. In a teletypewriter system, the combination of an automatic teletypewriter producing a variety of start-stop teletypewriter signals continuously, a relay, means responsive to said teletypewriter signals to operate said relay once for each signal, a teletypewriter producing a predetermined signal continuously at a constant speed independent of the speed of said first teletypewriter, and means including the armature and a contact of said relay for immediately modifying the predetermined signals in accordance with the operation of said relay to produce other teletypewriter signals.

2. In a teletypewriter system, the combination of a first teletypewriter operating automatically to produce a variety of teletypewriter signals continuously, a second teletypewriter producing a predetermined teletypewriter signal continuously, said second teletypewriter being independent of said first teletypewriter and producing said predetermined teletypewriter signal independently of the operation of said first teletypewriter, and means to indicate whether the signals of both teletypewriters are in synchronism, said means operating to produce a sequence of teletypewriter characters consisting of a cycle of repetitive series of characters when said teletypewriters are slightly out of synchronism.

3. In a teletypewriter system, the combination of a first teletypewriter operating automatically to produce a variety of teletypewriter signals continuously, a relay having a contact and an armature adapted to engage said contact when said relay is operated, means responsive to the signals of said first teletypewriter for operating and restoring said relay once for each signal of said first teletypewriter, a source for producing a predetermined teletypewriter signal continuously, and a combining circuit for receiving said predetermined teletypewriter signals interrupted by the contact of said relay to produce other teletypewriter signals to denote the difference in speed between said first teletypewriter and said source.

4. In a teletypewriter system, the combination of a teletypewriter producing a predetermined teletypewriter signal continuously, a receiving apparatus adapted to respond to a variety of start-stop teletypewriter signals continuously transmitted from a distant station, said receiving apparatus controlling a pair of contacts to open said contacts once for each signal to which said receiving apparatus responds, a circuit for receiving said predetermined signals, said circuit including said contacts for causing its interruption at regular intervals for modifying said predetermined signals.

5. In a teletypewriter system, the combination of a constant speed teletypewriter producing a predetermined teletypewriter signal continuously, a receiving apparatus adapted to respond to a variety of start-stop teletypewriter signals continuously transmitted from a distant station, and means for indicating the relative speed of said receiving apparatus, said means including means for producing pulses the frequency of which corresponds to the frequency at which signals are received by said receiving apparatus and means for combining said pulses and said predetermined signals to produce other teletypewriter signals.

6. In a teletypewriter system, the combination of a remote automatic teletypewriter producing a variety of teletypewriter signals continuously, and means for indicating the relative speed of said remote teletypewriter, said means including receiving apparatus having means associated therewith for producing pulses the frequency of which is identical with the frequency at which said remote teletypewriter is producing signals, a constant speed teletypewriter producing a predetermined teletypewriter signal continuously, and means for interrupting said predetermined teletypewriter signals in accordance with said pulses to produce other teletypewriter signals.

7. Apparatus for comparing the speed of an automatic teletypewriter producing a variety of teletypewriter signals continuously with the speed of a constant speed teletypewriter producing a predetermined teletypewriter signal continuously, comprising means for producing a repetitive series of pulses continuously and in synchronism with the reception at said means of the teletypewriter signals of said automatic teletypewriter irrespective of the variety of said signals, means for combining said pulses and said predetermined teletypewriter signals to produce still other teletypewriter signals, and means for recording said other teletypewriter signals.

8. The method of measuring the relative speed of an automatic teletypewriter producing a variety of teletypewriter signals continuously, which consists in producing a predetermined teletypewriter signal repeatedly and at a constant speed, interrupting said predetermined teletypewriter signals once in accordance with each teletypewriter signal of said automatic teletypewriter, converting said interrupted signals into teletypewriter characters, and recording the frequency with which identical characters are consecutively repeated in the sequence of said last-mentioned teletypewriter characters.

9. The method of measuring the relative speed of an automatic teletypewriter producing a variey of teletypewriter signals continuously, which consists in producing teletypewriter signals of the same predetermined character at a predetermined rate, producing pulses in synchronism with the teletypewriter signals of said automatic teletypewriter, modulating said teletypewriter signals of the same character in accordance with said pulses, and converting the modulated signals into teletypewriter characters, and recording the length of series of consecutively repeated characters among said last-mentioned teletypewriter characters.

WADE B. MARTIN.

REFERENCES CITED

The following references are of record in the file of this patent:

UNITED STATES PATENTS

| Number | Name | Date |
| --- | --- | --- |
| 2,298,956 | Mason | Oct. 13, 1942 |
| 1,312,572 | Parker | Aug. 12, 1919 |
| 1,609,383 | Shank | Dec. 7, 1926 |
| 1,800,056 | Dirkes | Apr. 7, 1931 |
| 1,862,474 | Fluharty | June 7, 1932 |